United States Patent
Gaur et al.

(10) Patent No.: US 8,667,222 B2
(45) Date of Patent: Mar. 4, 2014

(54) BYPASS AND INSERTION ALGORITHMS FOR EXCLUSIVE LAST-LEVEL CACHES

(75) Inventors: Jayesh Gaur, Bangalore (IN); Mainak Chaudhuri, Kanpur (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 13/078,415

(22) Filed: Apr. 1, 2011

(65) Prior Publication Data
US 2012/0254550 A1    Oct. 4, 2012

(51) Int. Cl.
*G06F 12/00* (2006.01)
(52) U.S. Cl.
USPC .......................................... 711/122
(58) Field of Classification Search
None
See application file for complete search history.

(56) References Cited

U.S. PATENT DOCUMENTS

2004/0133748 A1* 7/2004 Yang ............................ 711/144
2008/0209131 A1* 8/2008 Kornegay et al. ............. 711/135

* cited by examiner

*Primary Examiner* — Brian Peugh
(74) *Attorney, Agent, or Firm* — Blakely, Sokoloff, Taylor & Zafman LLP (57) ABSTRACT

An apparatus and method are described for implementing an exclusive lower level cache (LLC) policy within a computer processor. For example, one embodiment of a computer processor comprises: a mid-level cache circuit (MLC) for storing a first set of cache lines containing instructions and/or data; a lower level cache circuit (LLC) for storing a second set of cache lines of instructions and/or data; and an insertion circuit for implementing a policy for inserting or replacing cache lines within the LLC based on values of use recency and use frequency associated with the lines.

18 Claims, 11 Drawing Sheets

BYPASS AND INSERTION ALGORITHMS FOR EXCLUSIVE LAST-LEVEL CACHES

BACKGROUND

1. Field of the Invention

This invention relates generally to the field of computer processors. More particularly, the invention relates to bypass and insertion techniques implemented for processor caches.

2. Description of the Related Art

Inclusive last-level caches (LLCs) waste precious silicon estate due to cross-level replication of cache blocks. As the industry moves toward cache hierarchies with larger inner levels, this wasted cache space leads to bigger performance losses compared to exclusive LLCs. However, exclusive LLCs make the design of replacement policies more challenging. While in an inclusive LLC a block can gather a filtered access history, this is not possible in an exclusive design because the block is de-allocated from the LLC on a hit. As a result, the popular least-recently-used replacement policy and its approximations are rendered ineffective and proper choice of insertion ages of cache blocks becomes even more important in exclusive designs. On the other hand, it is not necessary to fill every block into an exclusive LLC. This is known as selective cache bypassing and is not possible to implement in an inclusive LLC because such a policy would violate inclusion.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

As mentioned above, inclusive last-level caches (LLCs) have been the preferred choice for designing on-die high-performance cache hierarchies. Such a choice is primarily motivated by the possible simplifications in the cache coherence protocol in an inclusive hierarchy; an LLC tag lookup is enough to decide if a cache block is not present in the inner levels of the cache hierarchy. In an exclusive LLC, however, a block is allocated only on an eviction from the inner level cache and de-allocated on a hit when the block is recalled by the inner level cache. As a result, a separate coherence directory array (decoupled from the LLC tag array) is needed to maintain coherence efficiently. While coherence simplification is seen as a major advantage of an inclusive LLC, such a design may waste silicon real estate due to replication of cached data in multiple levels of the hierarchy. With a three-level or a four-level cache hierarchy with reasonably large inner levels, such cross-level replication begins to degrade performance with an inclusive design when compared to an exclusive design.

The performance gains in an exclusive design over an identical inclusive design usually come from two factors. One factor is the overall capacity advantage enjoyed by the exclusive design. The second factor is related to premature evictions in the inner levels of the hierarchy caused by LLC replacements in an inclusive design. In the absence of access hints from the L1 and L2 caches, the last level (referred to as either L3 or LLC herein) of an inclusive design can end up making incorrect replacement decisions. The risk of premature evictions from the L1 and L2 caches caused by a partially informed LLC replacement policy is non-existent in an exclusive design.

Figure 1:
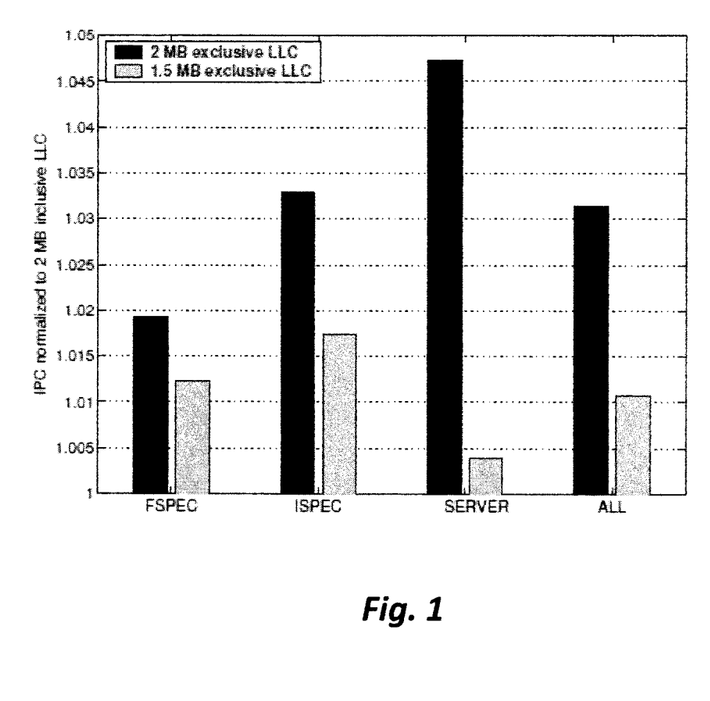
FIG. 1 illustrates a comparison of instructions retired per cycle (IPC) between exclusive and inclusive LLCs.

FIG. 1 is a chart that compares the number of instructions retired per cycle (IPC) between exclusive and inclusive LLCs with a 512 KB cache. Specifically, the figure shows the performance of an exclusive LLC with respect to an inclusive LLC for 98 single-threaded dynamic instruction traces representing different regions of floating-point SPEC 2006 (FSPEC), integer SPEC 2006 (ISPEC), and server (SERVER) applications with a tuned multi-stream hardware prefetcher enabled. Each trace runs for six million dynamic instructions after a sufficiently long warm up phase. For the left bar, the simulated three-level cache hierarchy in both inclusive and exclusive cases is identical in capacity and associativity at every level. More specifically, the left bar presents simulation results for an architecture with a 512 KB 8-way L2 cache and a 2 MB 16-way LLC. The bar on the right shows the performance of an exclusive LLC relative to an inclusive design, where the exclusive LLC is sized such that the effective capacity advantage of the exclusive design is nullified (1.5 MB 12-way).

In both cases, the inclusive LLC simulates a not-recently-used (NRU) replacement policy (one bit age per block) and the exclusive LLC simulates a one-bit not-recently-filled (NRF) replacement policy. The NRU policy victimizes the not recently used block (age zero) from the way with the smallest id. The NRF policy updates the age bit array only on a fill and is otherwise similar to NRU. Both the policies reset the age bits of all the blocks (except the one most recently accessed/filled) in a set to zero only if all blocks in that set have age of one. For each application category, the bar on the right in FIG. 1 brings out the performance difference stemming from the premature evictions from the inner levels of the cache hierarchy in the inclusive design. The bar on the left further adds the capacity advantage that an exclusive design enjoys. On average, for 98 traces, the exclusive design enjoys a 3.1% higher IPC than the inclusive design.

While premature LLC replacements can cause performance degradation in inclusive designs, a block resident in the LLC of an inclusive design can still observe a filtered version of access recency during its lifetime. This is not possible in an exclusive design. A block resides in the LLC of an exclusive design from the time it is evicted from the L2 cache to the time it is either recalled by the L2 cache or evicted by the LLC, whichever is earlier. Thus, an exclusive LLC serves as a large set-associative victim cache. Due to the absence of any access information in an exclusive LLC, the popular least-recently-used (LRU) replacement policy and all its well-researched derivatives lose significance. As a result, the design of replacement policies in an exclusive LLC requires a fresh look. A replacement policy has three distinct algorithmic components, namely, insertion algorithm, update algorithm, and victim selection algorithm. In this paper, we explore the algorithms for deciding the insertion age of a block in an exclusive LLC.

Another important optimization opportunity offered by an exclusive design is related to the fact that every block evicted from the L2 cache is not required to be sent to the LLC. Such a design with selective LLC insertion/bypass enabled can [Incomplete]

Figure 2:
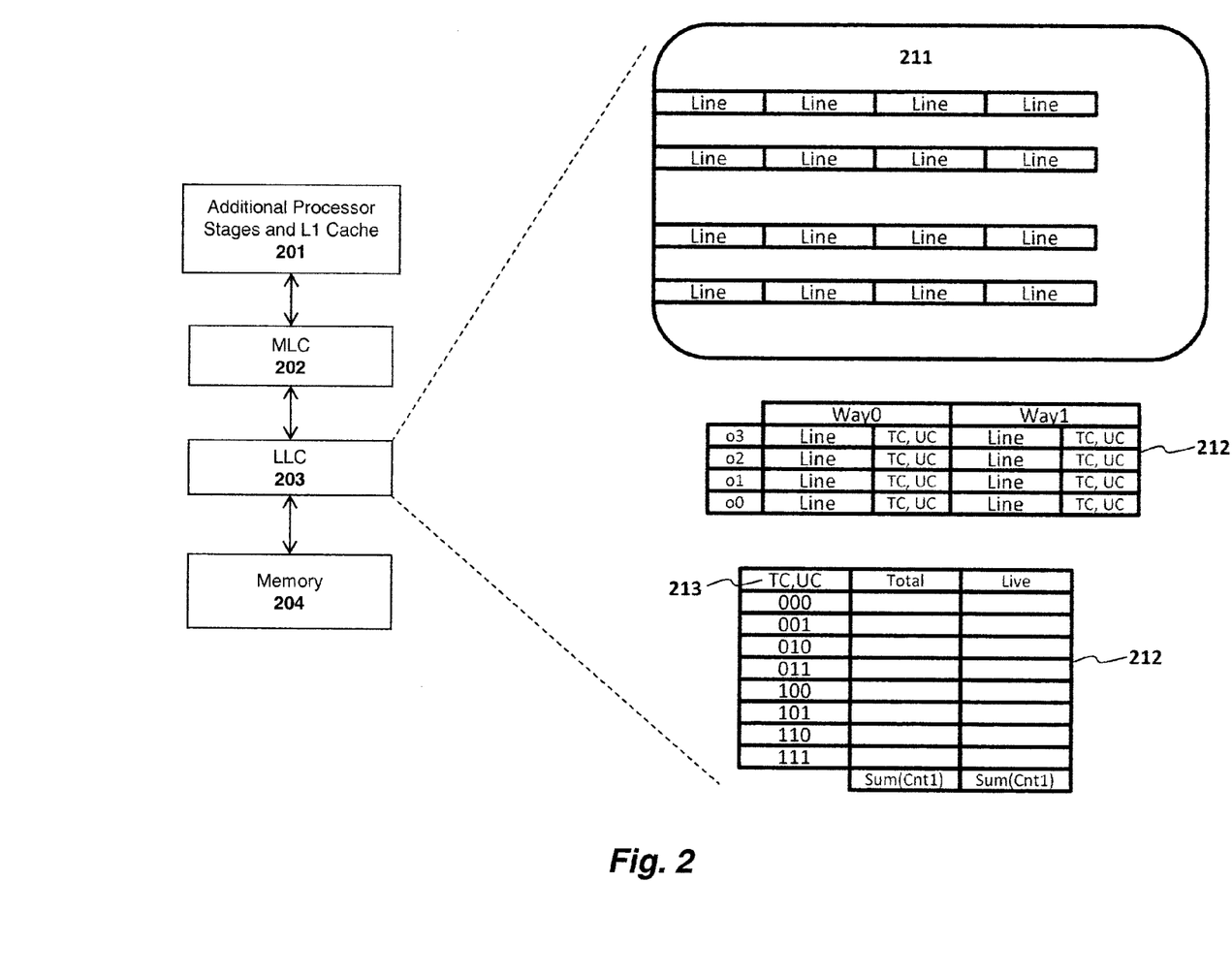
FIG. 2 illustrates logical structures employed within the LLC in one embodiment of the invention.
Figure 3:
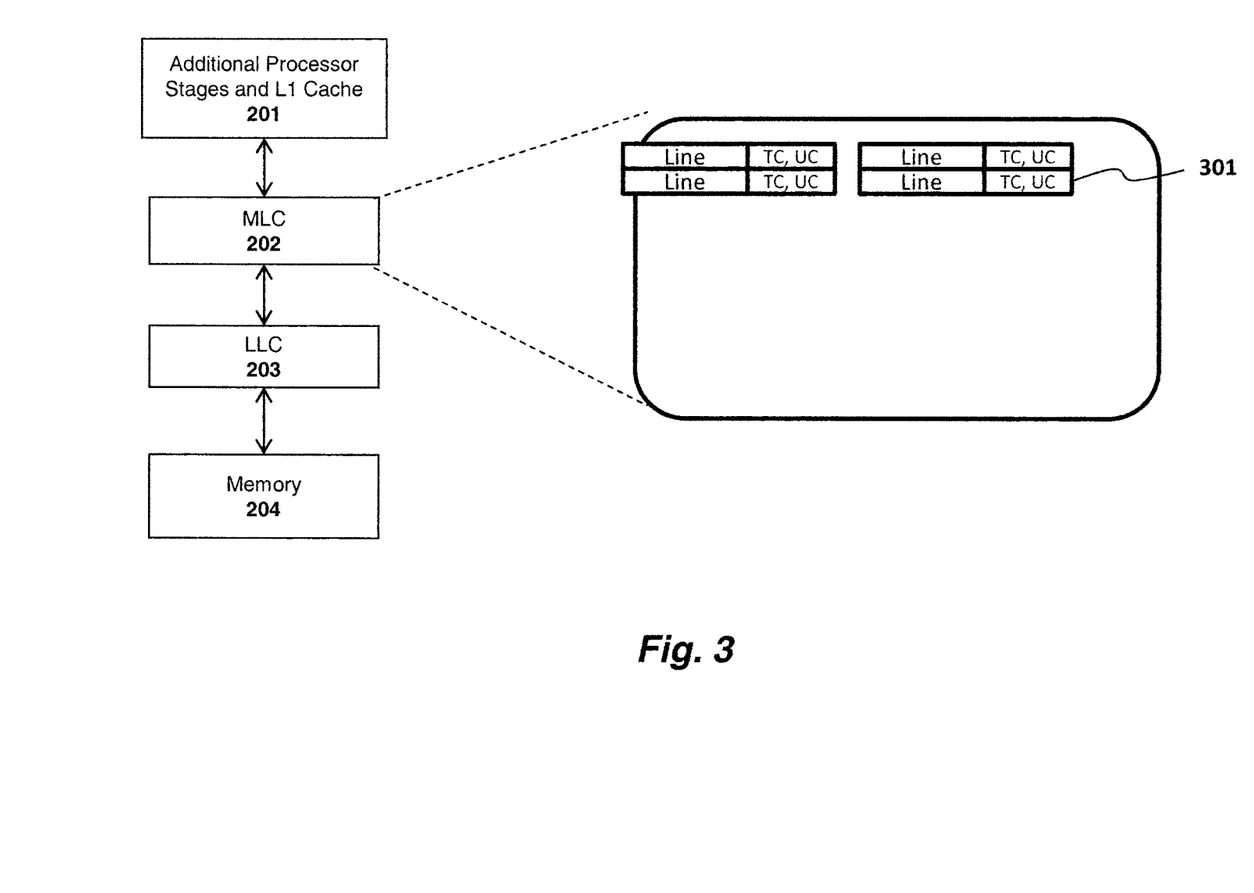
FIG. 3 illustrates logical structures employed within the MLC in one embodiment of the invention

Use recency and use frequency are the two properties that are traditionally employed to determine the death and liveness of a cache block. Exclusive LLCs make the effective use of these two properties challenging because a block is de-allocated from the LLC on its first recall from the inner-level caches. For purposes of illustration, a three level cache hierarchy is illustrated in FIG. 2-3 which includes a memory 204, a lower level cache (LLC) 203, a mid level cache (MLC) 202, and an upper level cache (ULC) or L1 cache 201. For the purposes of illustration, a set of cache lines 211-212 and corresponding trip count (TC) and use count (UC) values is illustrated for the LLC in FIG. 2. Similarly, a set of cache lines 301 and corresponding TC/UC values is illustrated in FIG. 3.

A block is filled into the MLC 202 when it is first brought from the DRAM. On an MLC cache 202 eviction, the block makes its first trip to the LLC 203. If the block is recalled from the LLC 203 before it is evicted, it will make its second trip to the LLC 203 eventually when it is victimized from the L2 cache again. These trips continue until the block is evicted from the LLC 203. In general, a block with low average recall distance is expected to have a higher overall trip count before it is evicted from the LLC 203.

Below we explore the possibility of exploiting the use count of a block during its residency in the MLC to further tune the classification of dead and live blocks. In one embodiment, every time a block is filled into the MLC (from DRAM or LLC) by a demand request, its use count (UC) is set to one. A block filled into the MLC by a prefetch request sets its use count to zero. In one embodiment, only a demand hit in the MLC increments the use count. In one embodiment, two UC bits are maintained in the MLC to record use count, illustrated as the rightmost bits in column 213 of the data structure 212 shown in FIG. 2. Thus, every block that comes to an LLC for allocation carries three bits of information with it, namely, the trip count (TC) (one bit) and use count (UC) (two bits). Based on the TC, UC values of an incoming block it is categorized into one of eight possible TC-UC bins 213. The techniques discussed below use information derived from the eight TC-UC bins 213 at the time of allocating a block to the LLC 203.

The design and implementation of the bypass and insertion algorithms for exclusive LLCs is discussed below. First we discuss the dynamic learning framework that all our algorithms use and then present the algorithms.

The bypass and insertion decisions should be based on the population of dead and live blocks in the TC-UC bins 213. Note that a block allocated in the exclusive LLC is classified as dead if it gets evicted before getting recalled by the MLC (these are essentially LLC victims); otherwise the block is classified as live. We would like to learn the dead and live populations in each TC-UC bin 213. Depending on the membership bin of an incoming block and the dead and live populations of that bin, we would like to take a decision about whether to bypass this block or what initial age to assign if it is not bypassed. To carry out this learning, we dedicate sixteen sample sets per 1024 sets of LLC that observe the dead and live populations of each TC-UCbin 213. These sets will be referred to as the "observers" and are illustrated as 211 in FIG. 2. The observers allocate all blocks and implement a static insertion age assignment scheme based on the single-bit TC value of an incoming block.

For each TC-UC bin per LLC bank, the observers maintain two values, namely, the difference of dead and live allocations to the observers (D−L) and the live allocations to the observers (L). Our algorithms need eight D−L and eight L counters per LLC bank corresponding to the eight TC-UC bins. When a block arrives at the LLC for allocation to one of the observers, the block's TC-UC bin b is decided based on the block's TC, UC values (carried by the eviction message from the L2 cache). The observer increments the D−L counter of bin b by one when the block is allocated. On a hit to a block B in an observer set, the observer decrements the D−L counter of the bin the block B belongs to by two and increments that bin's L counter by one. The observers maintain three bits per cache block to remember the bin an allocated block belongs to. A non-observer set, when allocating a block, first determines the block's membership bin based on the block's TC, UC values and then queries the D−L and L counters of that bin. The returned D−L and L values are input to the bypass and insertion algorithms we discuss next. The non-observer sets do not store any information pertaining to the bin membership of the allocated blocks.

When updating the D−L and L counters in an LLC bank, the observers also maintain the max(D−L), min(D−L), max (L), and min(L) across the TC-UC bins, excluding the UC=0 bins, within that LLC bank.

In addition to these, the aggregate D−L over all TC-UC bins, excluding the UC=0 bins, is maintained per LLC bank. We will refer to this as $\Sigma_{UC\neq 0}(D-L)$. One of our insertion algorithms requires that the observers maintain the aggregate L over all TC=0 bins with positive UC. We will refer to this aggregate as $\Sigma_{TC=0,UC\neq 0}(L)$. The updates of the maximum, minimum, and the aggregate values take place mostly off the critical path of LLC activities. Every N LLC allocations per bank, where N is equal to the number of observer sets per LLC bank multiplied by the LLC associativity, all the D−L and L counters (including the max, min, and aggregate values) in that LLC bank are halved so that a temporally-aware exponential average is maintained. Even with a storage overhead of two bytes per counter, the overall counter overhead is small. This general framework also requires every MLC 202 to store three additional bits to maintain the TC and UC values of the block (indicated in TC, UC column 213 of the data structure 212 in FIG. 2).

Good bypass algorithms would bypass incoming blocks that belong to bins with high D−L populations, yet low enough L populations. More specifically, an incoming block belonging to TC-UC bin b with counter values (D−L)b and Lb qualifies as a bypass candidate if (D−L)b≥½ (max(D−L)+ min(D−L)) and Lb≤½ (max(L)+min(L)). However, we find that there are situations where the overall magnitude of D−L is so high that even if the second condition fails, bypassing can be done without any performance degradation. Therefore, we override the outcomes of these comparisons if $$(D-L)_b \geq \frac{3}{4} \sum_{UC \neq 0} (D-L).$$

A more carefully chosen weight of magnitude lower than ¾ may improve the bypass performance further. We summarize our bypass algorithm in the following where bypass is a boolean-valued variable.

$$\text{bypass} = \left( (D-L)_b \geq \frac{1}{2}(\max(D-L) + \min(D-L)) \right. \quad (1)$$

AND $$L_b \leq \frac{1}{2}(\max(L) + \min(L)) \Big)$$

OR $$\left( (D-L)_b \geq \frac{3}{4} \sum_{UC \neq 0} (D-L) \right)$$

A bypassed block is treated exactly the same way as an LLC victim and it mimics the LLC eviction protocol.

To minimize the risk of performance loss, we always duel our bypass algorithm with the no-bypass algorithm of the observers. For this purpose, in addition to the observer sets, we dedicate an equal number of LLC sets (sixteen per 1024 LLC sets) that always execute our bypass algorithm.

We present three algorithms for insertion age assignment with progressively increasing complexity. These algorithms are applied to those blocks that are not bypassed. We assume a two-bit budget to maintain ages per LLC block. Our LLC replacement policy first looks for an invalid way in the target set. If there is no such way, it victimizes the block with the minimum age. A tie is broken by selecting the block with the least physical way id.

Our first insertion algorithm assigns all TC≥1 blocks an insertion age of three and all TC0 blocks an insertion age of one. This is a static policy that does not require any dynamic learning. This is the policy exercised by our observer sets. We will refer to this policy as the TC-AGE policy. We note that this algorithm is similar in spirit to the SRRIP algorithm proposed for inclusive LLCs. In our age assignment setting where a lower age corresponds to a higher replacement priority, the SRRIP algorithm would assign an insertion age of one to a newly allocated block and promote it to the highest possible age on a hit in an inclusive LLC. In an exclusive LLC, the blocks that have seen LLC hit(s) in the past are necessarily the TC≥1 blocks.

Our second insertion algorithm continues to assign the highest age, i.e., three to the TC≥1 blocks, but it assigns more finely graded ages to the TC0 blocks. To achieve this, it takes help of the dead and live populations learned by the observers. This algorithm recognizes the fact that the TC0 blocks belonging to bins with low hit rates should not get a positive age. If a certain bin b satisfies Db>xLb or equivalently, (D−L)b>(x−1)Lb, that would translate to a hit rate bounded above by 1/(x+1) for blocks belonging to bin b (hit rate is Lb/(Db+ Lb)). We would like to assign an insertion age of zero to an incoming block if it belongs to a TC=0 bin with too low a hit rate. However, we find that there are situations where the hit rate of the target bin is low, but the bin still has a fairly high number of live blocks i.e., Lb is above a threshold. In these cases, assigning a zero insertion age is too risky. Overall, we assign an insertion age of zero to a TC0 block belonging to bin b with positive UC if it satisfies $$(D-L|)_b > (x-1)L_b \text{ AND } L_b < \frac{3}{4} \sum_{TC=0, UC \neq 0} (L). \quad (2)$$

All the remaining TC0 blocks with positive UC are inserted at an age of one. We will refer to this policy as the TC-UC-AGE policy. We evaluate this policy for x=4, 8.

Our third insertion algorithm is similar to the TC-UC-AGE policy, but instead of assigning an age of one to all the TOO blocks with positive UC that do not satisfy Equation 2 above, it grades them from age one to three based on live population. First, the algorithm ranks the three TC=0, UC≠0 bins based on their L values and tags the bin having the smallest L value with an age of one and the one with the highest L value with an age of three. Next, the algorithm determines the bin that the incoming block belongs to and assigns the corresponding insertion age to this block. We will refer to this policy as the TC-UC-RANK policy. None of our insertion age assignment schemes require dueling with the observers.

We give some special consideration to the bins with UC=0. As we have pointed out, the blocks belonging to these bins are the result of either premature, yet correct, prefetches that failed to see a demand hit during their residency in the L2 cache or incorrect prefetches that will not see a demand hit in near future. Our bypass algorithm continues to remain oblivious to such cases and treats the UC=0 bins exactly the way it treats the other bins. Our TC-AGE insertion algorithm does not do anything special for the UC=0 blocks.

Figure 4:
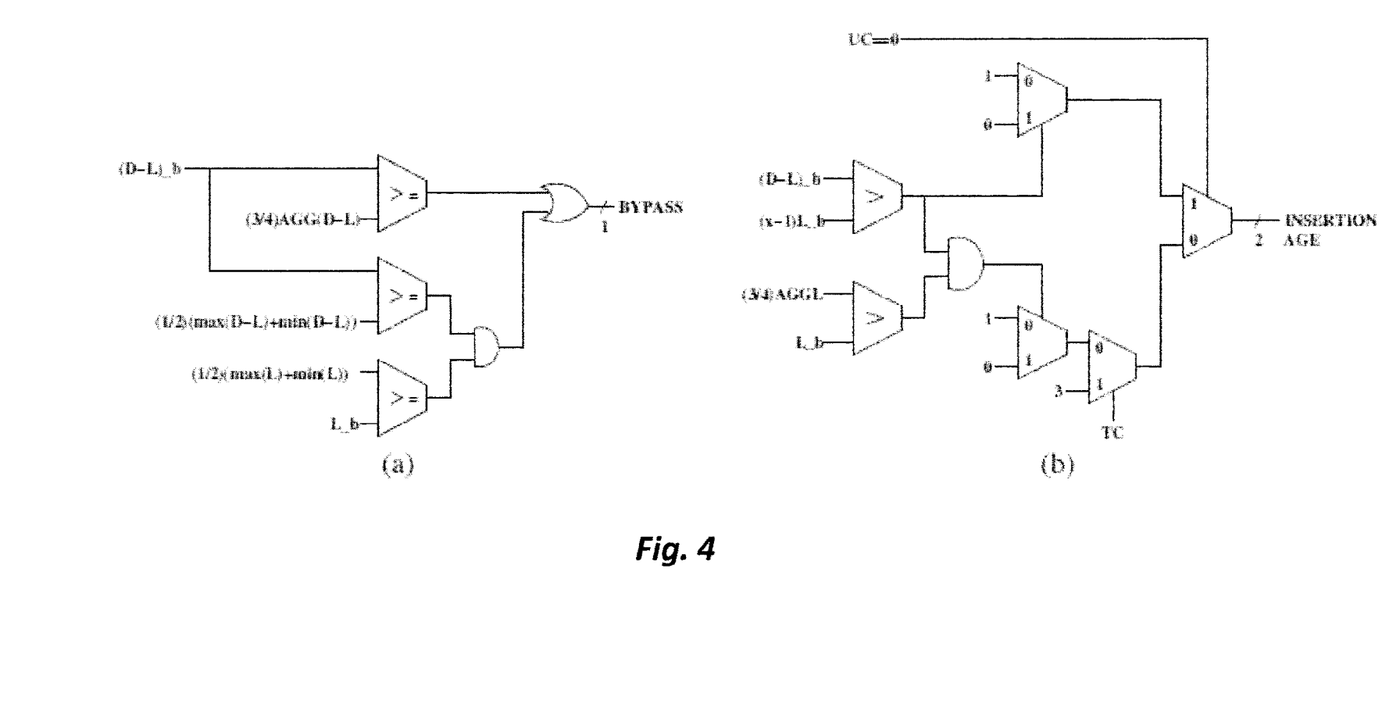
FIG. 4 illustrates logic diagrams illustrating bypass (a) and TC-UC-AGE algorithms in accordance with one embodiment of the invention.

The other two insertion algorithms assign a zero insertion age to a (TC=0, UC=0) block belonging to bin b if it satisfies (D−L)b>(x−1)Lb (here b is (TC=0, UC=0)). All other (TC=0, UC=0) blocks receive an insertion age of one. All (TC>=1, UC=0) blocks receive an insertion age of one. FIG. 4 shows our bypass and TC-UC-AGE logic diagrams. The critical path of the insertion age assignment logic can be hidden under the LLC fill latency.

Upgrading our bypass and insertion algorithms to a multithreaded environment requires maintaining the D−L and L counters for each TC-UC bin per thread. Each thread is also assigned a separate set of observers. The observers earmarked for a particular thread execute TC-AGE insertion for that thread and the best emerging duel winner for each of the other threads (similar to TADIP-F) if bypassing is enabled. We use four observers per thread per 1024 LLC sets. Our counter update schemes do not require storage of thread id in the LLC to incorporate thread-awareness. We assume one thread per core in this article. At the time of an LLC allocation, the core id of the source L2 cache is available because this information is needed to update the coherence directory and therefore, the appropriate D−L counter can be incremented. At the time of an LLC hit, the core id of the requester is available and therefore, the appropriate D−L counter can be decremented and the appropriate L counter can be incremented. Also, the maximum, minimum, and aggregate values of several counters, as discussed above, must be maintained per thread.

Simulations were done on a cycle-accurate execution-driven x86 simulator. Our 4 GHz 4-way dynamically scheduled out-of-order issue core model closely follows the core microarchitecture of the Intel Corei7 processor. Throughout this study, we assume one physical thread context per core. Each core has its own L1 and L2 caches. The L1 instruction cache is 32 KB 4-way associative and the L1 data cache is 32 KB 8-way associative. The unified L2 cache is 512 KB 8-way associative. The L2 cache is partially inclusive (also known as non-inclusive) of the L1 caches in the sense that an L2 cache eviction always queries the L1 caches for up-to-date state and data, but the L1 cache may choose to retain the block instead of invalidating. For the single-thread studies, we model a 2 MB 16-way exclusive LLC partitioned into two banks, each being 1 MB 16-way. For the multi-programming studies, we model four cores with private L1 and L2 caches and the cores are connected over a ring. Each core hop of the ring has a shared 2 MB 16-way exclusive LLC bank attached to it leading to an aggregate 8 MB 16-way shared LLC. The block size at all the three levels of the cache hierarchy is 64 bytes. We model a six-cycle hit latency (tag+data) for the L2 cache and an eight-cycle hit latency (tag+data) for each LLC bank. The ring hop time is one cycle. We model a coherence directory that can accommodate four times the number of aggregate L2 cache tags. For all simulations, we model a two-channel integrated memory controller clocked at the core frequency with each channel connecting to an 8-way banked DDR3-1866 DIMM. The DRAM part has burst length of 64 bits and 10-10-10 access cycle parameters (each cycle is about 1.1 ns). In this paper, we show results without and with hardware prefetchers enabled. In the latter case, we model per-core aggressive multi-stream instruction and data prefetchers that bring blocks into the L2 cache of the core.

Our single-threaded traces span three workload categories, namely, floating-point SPEC 2006 (FSPEC), integer SPEC 2006 (ISPEC), and server (SERVER). We first identified about two hundred representative dynamic code regions each of length six million dynamic instructions for detailed IPC measurement prefixed with a sufficiently large dynamic region (several hundreds of million instructions) to warm up caches and microarchitectural arrays (predictors and queues). All the policies evaluated in this application are executed from the beginning of the warmup to make sure that the detailed cycle-accurate measurement phase captures a steady-state snapshot. Out of these two hundred regions, we picked 98 regions that remain sensitive to uncore optimizations even after a well-tuned aggressive multi-stream prefetcher is enabled. In these 98 traces, we have 44 FSPEC traces spanning one dozen applications, namely, bwaves, cactusADM, dealII, GemsFDTD, Ibm, leslie3d, milc, soplex, sphinx3, tonto, wrf, and zeusmp. We have 23 ISPEC traces spanning seven applications, namely, bzip2, gcc, gobmk, libquantum, mcf, omnetpp, and xalancbmk. Finally, we have 31 server traces drawn from applications such as SAP, SAS, SPECjbb, SPECweb2005, TPC-C, TPC-E, etc.

We present results for 35 4-way multi-programmed workloads prepared by mixing four single-threaded traces. These multi-programmed mixes are representative in the sense that they include representative single-threaded traces from all three workload categories. Within a mix, each thread first executes its warmup region before starting the detailed performance simulation. If a thread finishes its performance simulation phase of six million instructions early, it continues executing so that we can model the shared LLC contention properly. The mix terminates after each thread has committed its six million instructions.

Figure 5A:
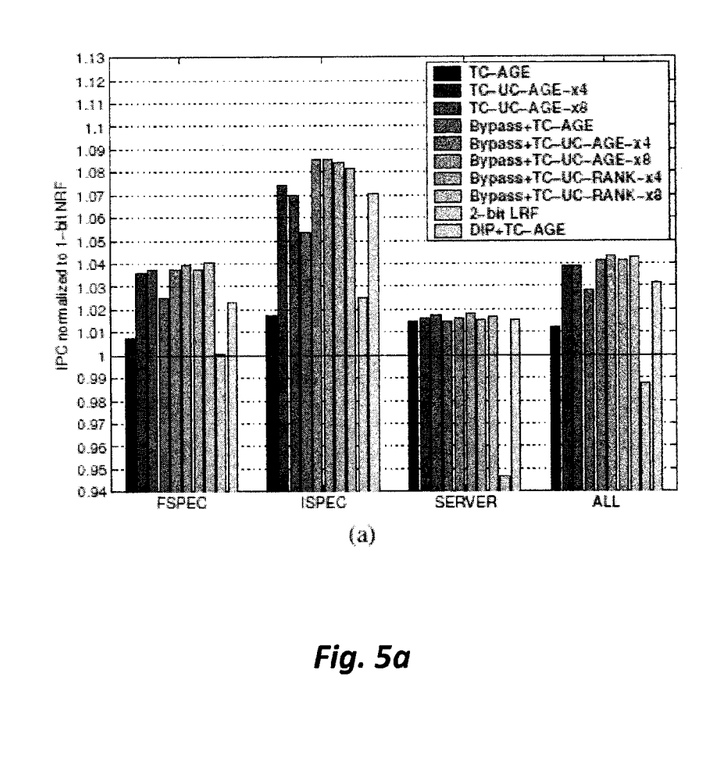
FIGS. 5a-b illustrate a summary of performance of several policies normalized to 1-bit NRF (a) and distribution of IPC improvements (b) for one embodiment of the invention.

We first present the simulation results with hardware prefetchers disabled. FIG. 5a summarizes the geometric mean IPC of several policies normalized to 1-bit NRF for three single-threaded workload categories (FSPEC, ISPEC, and SERVER) and overall (ALL). In each category, the leftmost three bars show the performance of static TC-AGE insertion and dynamic learning-based TC-UC-AGE insertion with x=4, 8. To avoid unnecessarily increasing the number of policy bars, we will show the performance of TC-UC-RANK only in the presence of bypassing. The next five bars show the performance of LLC bypassing executing with three different insertion algorithms. Note that in each of these five cases, the evaluated policy (e.g., Bypass+TC-UC-AGE-x8) is always dueled with the observers executing TC-AGE and if the observers emerge the winner, the followers disable bypassing, but continue to execute the insertion component (e.g., TC-UC-AGE-x8) of the policy. We have also experimented with a 2-bit approximation of least-recently-filled (LRF) replacement policy that ranks the blocks in a set by their fill order (can only distinguish between the last three fills). Finally, the rightmost bar in each workload category shows the performance of dynamic insertion policy (DIP) in the presence of TC-AGE insertion. This policy inserts all TC≥1 blocks at age three and duels the TC0 blocks between insertion age of zero and one. This policy is analogous to the DRRIP policy proposed for inclusive LLCs. We also experimented with the original DIP proposal. The performance of this policy (not shown) is worse compared to the DIP+TC-AGE policy discussed here. The TC-AGE policy improves performance by more than 1% averaged over the 98 traces (see the ALL group). This result motivated us to use the TC-AGE policy for the observers in the place of NRF. The TC-UC-AGE policy improves the overall performance by almost 4%, with ISPEC showing an average performance improvement of more than 7% compared to NRF. Overall, there is no performance difference between x=4 and x=8 for TC-UC-AGE. Our bypass algorithm running with TC-AGE improves overall performance by 2.8%, with ISPEC showing an impressive 5.3% improvement. However, these data show that the TC-UC-AGE insertion algorithm alone can achieve better performance across the board compared to bypassing dueled with TC-AGE'. Nonetheless, the Bypass+TC-AGE policy still offers an attractive design point. LLC bypassing coupled with TC-UC-AGE offers the best performance across the board with x=8.

The best combination i.e., Bypass+TC-UC-AGE-x8 improves the overall IPC of the 98 traces by 4.3% with FSPEC, ISPEC, and SERVER showing individual improvements of 3.9%, 8.5%, and 1.8%, respectively. Correspondingly, it saves 8%, 11%, and 8% of the baseline LLC misses. The IPC benefits coming from the LLC miss savings in the SERVER category are dwarfed because these workloads suffer from high volumes of L1 instruction cache misses. Overall, the Bypass+TC-UC-AGE-x8 policy requires three additional bits per L2 cache block for maintaining TC/UC values, two additional bits per LLC block in the non-observer sets for maintaining the age, five additional bits per LLC block in the observer sets (sixteen observer sets per 1024 LLC sets) for maintaining the age and the bin identity, and a 16-entry partial (ten bits) set index CAM per 1024 LLC sets to access the appropriate observer's five-bit metadata array. The total overhead computed as a fraction of the L2 cache and the LLC data array storage comes to about 0.5%.

The performance results for Bypass+TC-UC-RANK show that the addition of insertion age ranking mechanism based on live population does not improve performance beyond what Bypass+TC-UC-AGE delivers with x=8. In fact, in ISPEC category, the ranking mechanism slightly hurts performance because it cannot distinguish between the TC0 and TC≥1 blocks inserted with age three. The 2-bit LRF policy improves ISPEC by 2.5%, but degrades the server workloads by 5.4%. The primary shortcoming of this policy is that a block's age in a set climbs down to zero within four fills to that set and the block becomes eligible for eviction. The 1-bit NRF policy requires a higher average number of fills before it resets a block's age to zero (see Section 1). Finally, the DIP+TC-AGE policy improves the overall IPC by 3.2% with ISPEC improving by about 7% in IPC. In the following, we analyze the performance of our best policy (Bypass+TC-UC-AGE-x8) in greater detail.

Figure 5B:
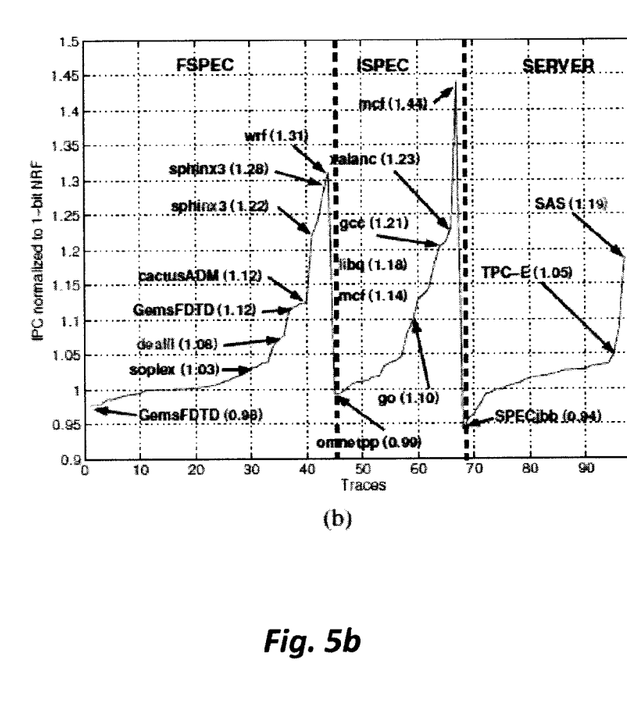

FIG. 5b shows the details of the IPC improvements achieved by individual traces running with our best LLC policy (Bypass+TC-UC-AGE-x8) compared to the baseline 1-bit NRF. The traces in each of the three categories are sorted by the IPC improvements. Some of the traces are also marked on the curve with their IPC improvements shown within parentheses. It is important to note that different regions of the same application (e.g., GemsFDTD) react very differently to our policy, thereby emphasizing the need to simulate multiple regions of the same application. Overall, the FSPEC traces show a performance improvement of at most 31% while suffering from a performance loss of at most 2%. The ISPEC traces experience IPC improvement of up to 44% while losing at most 1% performance. The server traces show an IPC improvement of up to 19%, but also suffer from up to 6% performance losses (the poorly performing SPECjbb trace is not friendly to TC-UC-AGE).

Next, we quantify the contributions of the LLC bypass component in our best policy (Bypass+TC-UCAGE-x8). FIG. 7(a) shows, for each trace, the fraction of L2 cache evictions bypassed by the Bypass+TCUC-AGE-x8 algorithm at the time of LLC allocation. We also identify some of the application traces that show moderate to high bypass fractions. The traces are sorted exactly in the same order as in FIG. 6(b).

Overall, across 98 traces, on average, 32% of the L2 cache evictions are not allocated in the LLC. For FSPEC, ISPEC, and SERVER categories, the bypass percentages are 37%, 52%, and 11%, respectively.

Figure 6A:
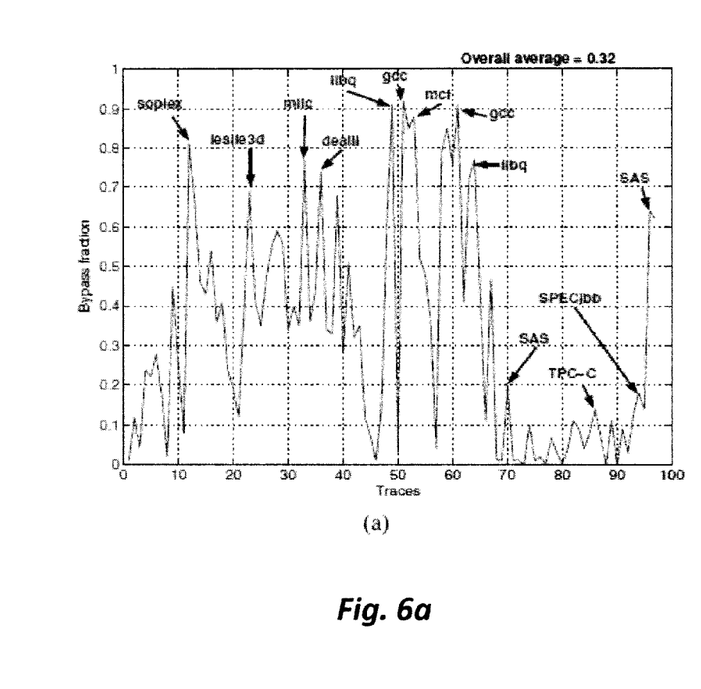
FIGS. 6a-b a distribution of bypass fraction in one policy (a) and details of additional performance gains achieved by bypassing on top of TC-UC-AGE-x8 (b).
Figure 6B:
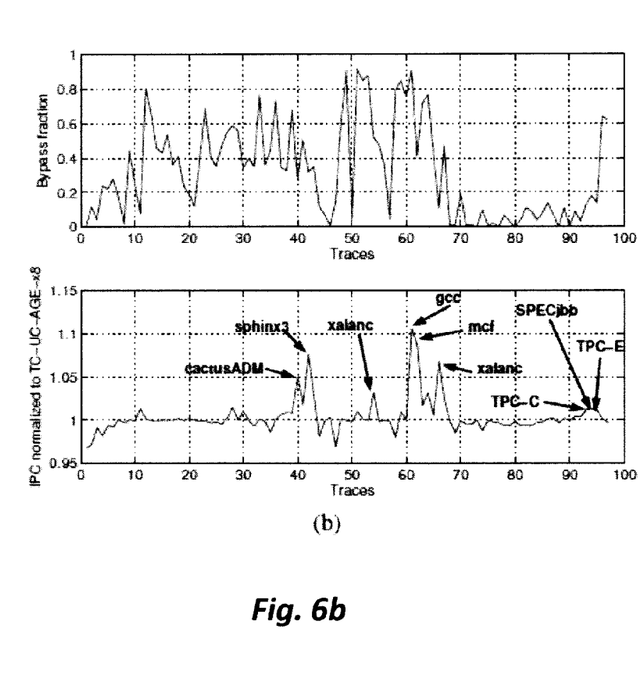
Figure 7:
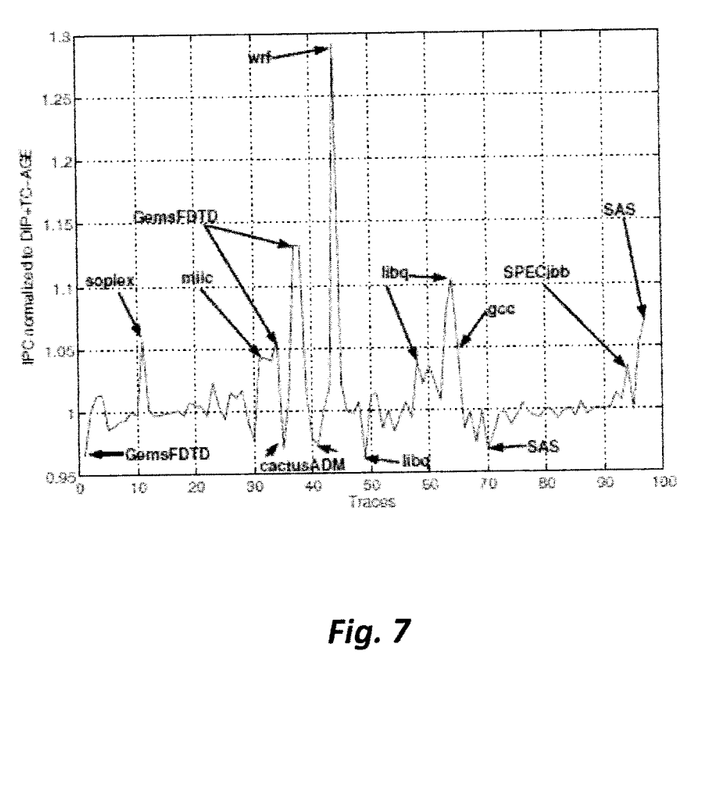
FIG. 7 illustrates IPC of one policy normalized to DIP+TC-AGE.

To further quantify the performance impact of LLC bypasses in our best policy, the bottom panel of FIG. 6b shows the IPC of Bypass+TC-UC-AGE-x8 relative to TC-UC-AGE-x8, while the top panel reproduces the bypass fraction distribution. Some of the application traces that enjoy noticeable benefit from LLC bypass are marked on the graph of the bottom panel. It is clear that the server traces do not enjoy much performance benefit from LLC bypasses as far as the capacity benefit is concerned. However, several FSPEC and ISPEC traces show significant improvements in IPC due to LLC bypass. It is important to note that a high bypass fraction does not necessarily translate to performance improvement because the retained blocks may not always have small enough reuse distances that can fit within the LLC reach. Nonetheless, our impressive bypass fraction can lead to interconnect bandwidth savings and result in further performance improvements, if our LLC bypass scheme is implemented at the L2 cache interface.

FIG. 7 shows the IPC of our best policy (Bypass+TC-UC-AGE-x8) relative to the DIP+TC-AGE policy, with several interesting trace points marked on the curve to show exactly where we gain and lose. The traces are sorted exactly the same way as in FIG. 6(b). As we have already noted, we see different regions of the same application behaving differently (e.g., GemsFDTD, libquantum, SAS). Overall, while we see several traces gaining significantly compared to DIP+TC-AGE, the losses are not large.

Figure 8A:
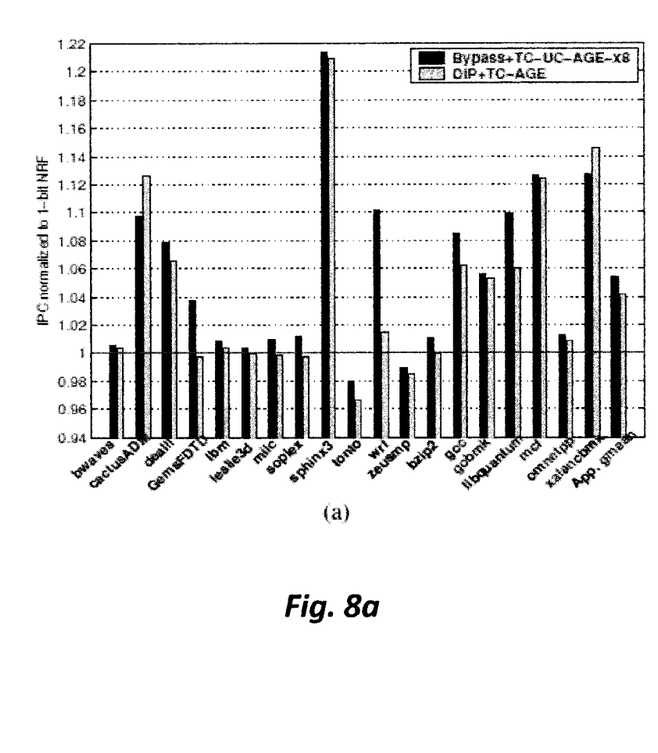
FIGS. 8a-b illustrate details of IPC improvement achieved by one policy and DIP+TC-AGE for (a) selected SPEC 2006applications and (b) server applications.
Figure 8B:
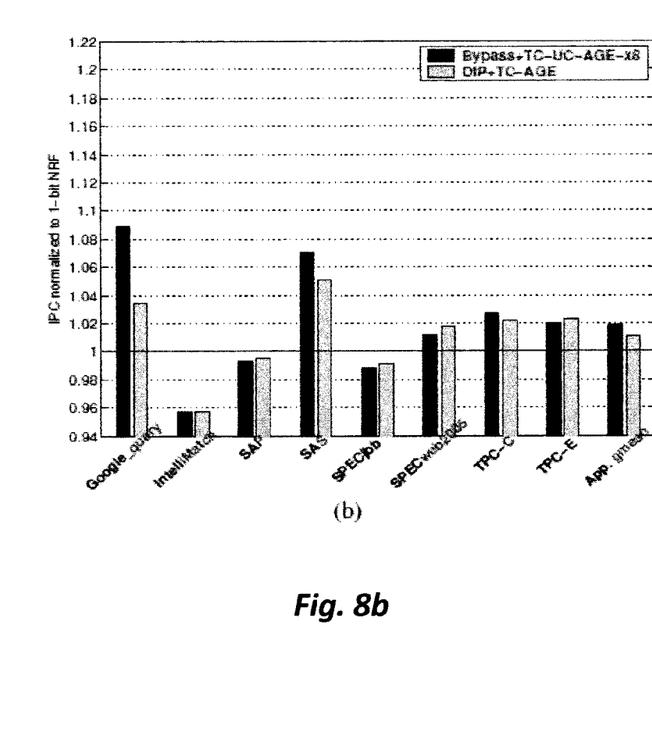

FIGS. 8a and 8b show an application-level comparison between Bypass+TC-UC-AGE-x8 and DIP+TC-AGE for SPEC 2006 and server workloads, respectively. The normalized IPC figure for each application shown in these charts is computed by taking the geometric mean of the normalized IPCs of all the traces belonging to that application. Overall, for the nineteen SPEC 2006 applications, our best policy improves IPC by 5.4% compared to 1-bit NRF, while for the eight server applications, the corresponding improvement is 1.9%. The respective improvements achieved by DIP+TC-AGE are 4.1% and 1.1%.

Figure 9A:
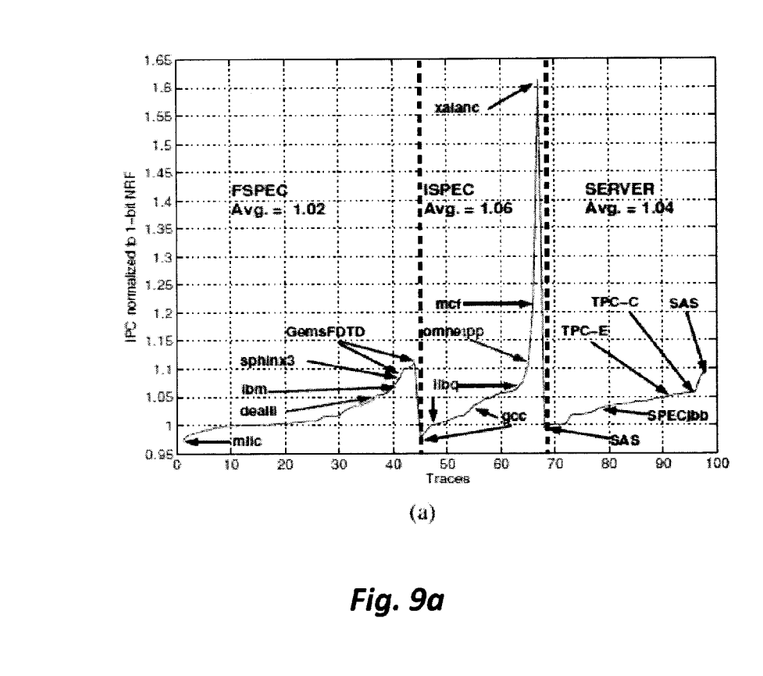
FIG. 9a-b illustrate a distribution of IPC improvements of one policy normalized to 1-bit NRF (a) and IPC of one policy normalized to DIP+TC-AGE (b).

Finally, we turn to the performance results with an aggressive multi-stream hardware prefetcher enabled. FIG. 9a shows the IPC improvements achieved by Bypass+TC-UC-AGE-x8 compared to the 1-bit NRF baseline with prefetchers enabled. Within each workload category, the traces are sorted by IPC improvements.

Overall, for FSPEC, the IPC improvement averages at 2%; for ISPEC it is 6%; for server traces it is 4%. While the average IPC improvements for FSPEC and ISPEC have dropped compared to the non-prefetched scenario (as expected), the improvement has gone up for server traces. We find that our special handling of the UC=0 bins (see Section 3.4) helps the server traces significantly, since it is usually hard to accurately prefetch data for the server workloads. Overall, with prefetchers enabled, the IPC improvement achieved by our best policy (Bypass+TC-UC-AGE-x8) across 98 traces is 3.4%. The corresponding improvement seen by DIP+TC-AGE is 2.8%. The bypass fraction achieved by Bypass+TC-UC-AGE-x8 with the prefetchers enabled is, on average, 28% of all L2 cache evictions.

Figure 9B:
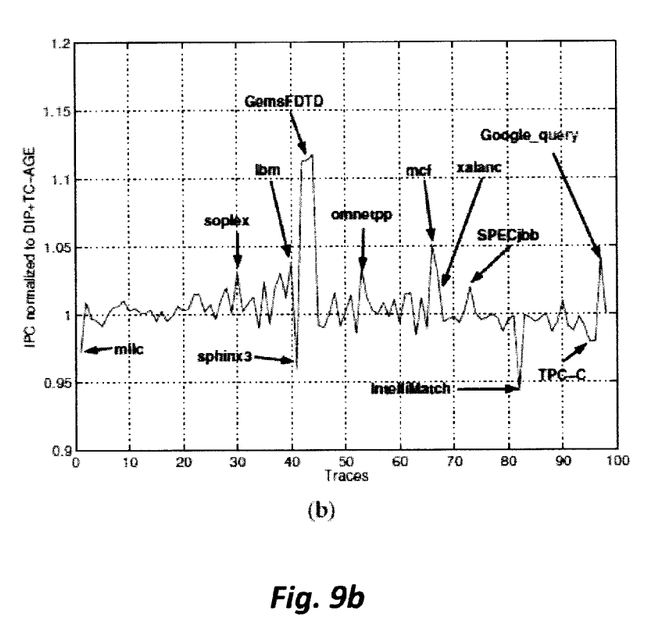

FIG. 9b further quantifies the difference between Bypass+TC-UC-AGE-x8 and DIP+TC-AGE in the presence of prefetching. This plot shows the IPC of Bypass+TC-UC-AGE-x8 normalized to that of DIP+TC-AGE. The traces are sorted in the same way as in FIG. 10(a). Several traces where our policy enjoys noticeable gains or suffers from noticeable losses are marked on the curve.

Figure 10A:
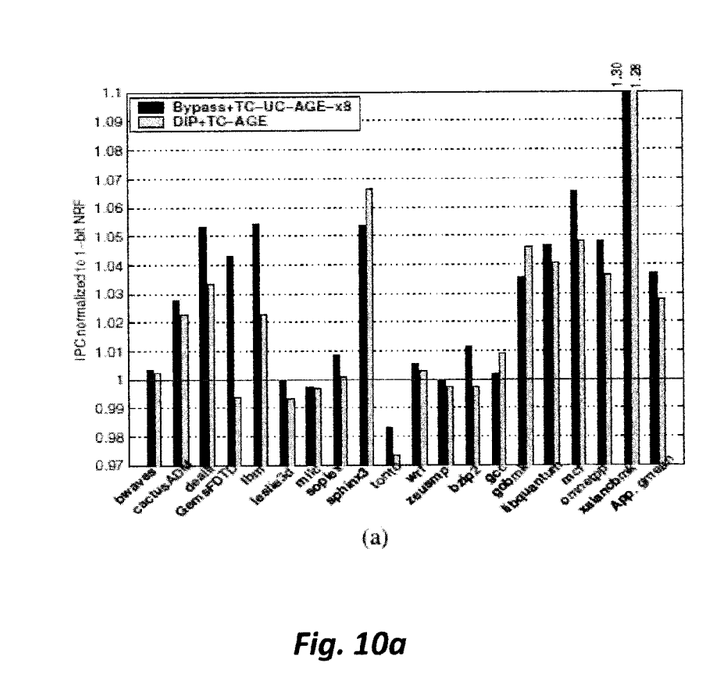
FIGS. 10a-b illustrate details of IPC improvement achieved by one policy and DIP+TC-AGE for selected SPEC2006 applications (a) and server applications in the presence of prefetchers (b).
Figure 10B:
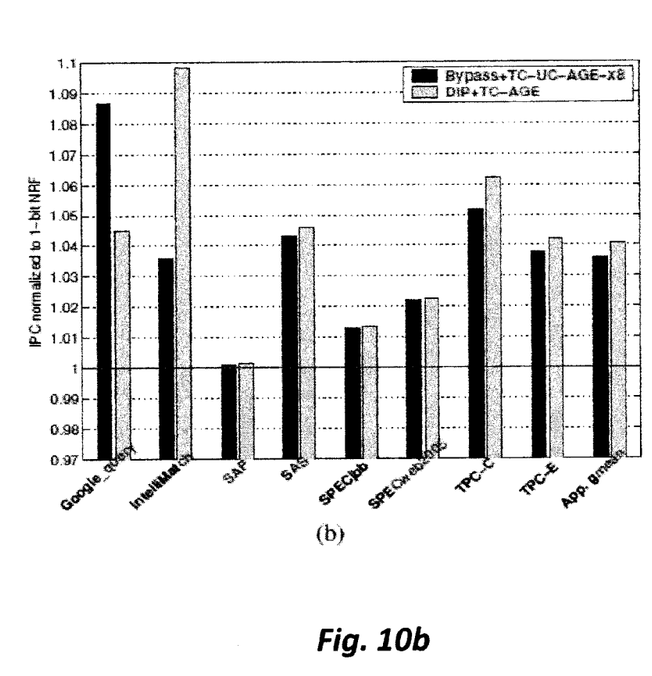

FIGS. 10a and 10b show the application-level IPC improvements for our best policy and DIP+TCAGE normalized to the 1-bit NRF baseline with prefetchers enabled. For the SPEC 2006 applications (FIG. 10a), our policy improves IPC by 3.7%, on average. The corresponding improvement in the server applications is 3.6% (FIG. 10b).

Figure 11:
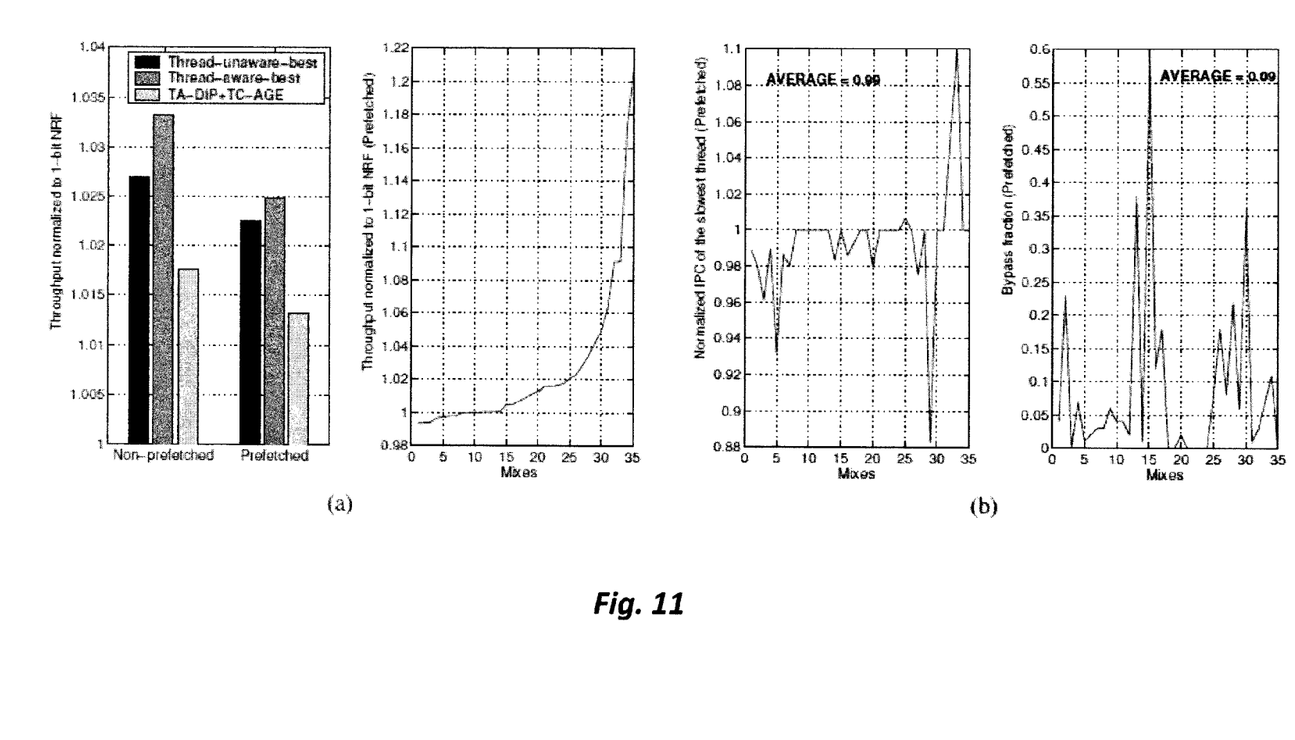
FIG. 11 illustrates throughput improvements, fairness and bypass fraction for the 4-way multi-programmed workloads.

A discussion of the multi-programmed performance results will now be provided. The leftmost panel of FIG. 11 shows the average IPC or throughput improvement achieved by ($\Sigma_i \text{IPC}_i^{Policy} / \Sigma_i \text{IPC}_i^{Base}$) three policies, namely, thread-oblivious best policy (Bypass+TC-UC-AGE-x8), thread-aware best policy (Bypass+TC-UC-AGE-x8), and thread-aware DIP+TC-AGE for 35 4-way multi-programmed mixes. The thread-aware dueling mechanism is borrowed from the TADIP-F proposal. We show the performance comparison for both non-pref etched and prefetched scenarios. The second panel of FIG. 11 shows the distribution of throughput improvements of our best policy (thread-aware Bypass+TC-UC-AGE-x8) with hardware prefetchers enabled. Overall, thread-awareness brings bigger performance gains in the absence of prefetching. The thread-aware Bypass+TC-UC-AGE-x8 policy improves the throughput by 2.5% in the presence of prefetching, while the thread-aware DIP+TC-AGE policy improves the throughput by 1.3%.

To make sure that the maximum slowdown of any individual thread is within acceptable range, the third panel of FIG. 11 quantifies a conservative fairness metric $$\min_i \frac{IPC_i^{Policy}}{IPC_i^{Base}}$$

i.e., the normalized IPC of the slowest thread in each mix for the thread-aware Bypass+TC-UC-AGE-x8 policy with hardware prefetchers enabled. The mixes are ordered in the same way as in the second panel. Except for a few mixes, the slowdown experienced by the slowest thread is within 2% compared to the baseline and, on average, this is 1%. Finally, the rightmost panel of FIG. 12 details the bypass fraction achieved by the thread-aware Bypass+TC-UC-AGE-x8 policy with hardware prefetchers enabled. While several mixes enjoy high to medium bypass fractions, the average is 9%.

The various embodiments of the invention described herein make the important observation that LRU and its approximations lose meaning in exclusive LLCs and proposes a number of design choices for selective bypassing and insertion age assignment for such designs in a three-level cache hierarchy. Our LLC bypass and age assignment decisions are based on two properties of a block when it is considered for allocation in the LLC. The first one is the number of trips (trip count) made by the block between the L2 cache and the LLC from the time it is brought into the hierarchy till it is evicted from the LLC. The second property is the number of L2 cache hits (use count) experienced by a block during its residency in the L2 cache. One proposal is a combination of bypass and age insertion schemes based on trip count and use count, which improves the average (geometric mean) IPC of 98 single-threaded traces by 3.4% compared to a baseline not-recently-filled replacement policy in a 2 MB 16-way exclusive LLC with aggressive multi-stream prefetchers. The corresponding improvement in throughput seen by 35 4-way multi-programmed mixes is 2.5%.

What is claimed is:

1. A computer processor comprising:
   a mid-level cache circuit (MLC) for storing a first set of cache lines containing instructions and/or data;
   a last level cache circuit (LLC) for storing a second set of cache lines of instructions and/or data, wherein the LLC includes a data structure for storing a trip count (TC) value and use count (UC) value, the TC and UC values being combinable to determine whether to insert or not insert a cache line into the LLC; and
   an insertion circuit for implementing a policy for inserting or replacing cache lines within the LLC based on TC and UC values associated with the lines.

2. The computer processor as in claim 1 wherein an exclusive cache policy is implemented such that when a cache line is stored in the LLC it is not stored in the MLC and when a cache line is stored in the MLC it is not stored in the LLC.

3. The computer processor as in claim 1 wherein when a cache line is filled into the MLC from memory or from the LLC by a demand request, its UC value is set to one.

4. The computer processor as in claim 3 wherein when a cache line is filled into the MLC by a prefetch request, its UC is set to zero.

5. The computer processor as in claim 1 wherein a plurality of observers are defined which allocate all cache lines in the LLC and implement a static insertion age assignment based on a single-bit trip count (TC) value of an incoming cache line.

6. The apparatus of claim 1, wherein the TC is a 1-bit value and the UC is a 2-bit value.

7. The apparatus of claim 1, wherein the TC and UC values belong to a plurality of TC-UC bins.

8. The apparatus of claim 1, further comprising:
   observers to maintain, for each TC-UC bin, live allocations and a difference of dead and live allocations.

9. A method comprising:
   storing a first set of cache lines containing instructions and/or data in a mid-level cache circuit (MLC);
   storing a second set of cache lines of instructions and/or data in a last level cache circuit (LLC);
   storing a trip count (TC) value and use count (UC) value, the TC and UC values being combined to determine whether to insert or not insert a cache line into the LLC;
   inserting or replacing cache lines within the LLC based on the stored TC and UC values associated with the lines.

10. The method as in claim 9 further comprising inserting or replacing the cache lines according to an exclusive cache policy such that when a cache line is stored in the LLC it is not stored in the MLC and when a cache line is stored in the MLC it is not stored in the LLC.

11. The method as in claim 9 further comprising setting a cache line's UC value to one when the cache line is filled into the MLC from memory or from the LLC by a demand request.

12. The method as in claim 11 further comprising setting the cache line's UC value to zero when the cache line is filled into the MLC by a prefetch request.

13. The method as in claim 9 further comprising defining a plurality of observers which allocate all cache lines in the LLC and implement a static insertion age assignment based on a single-bit trip count (TC) value of an incoming cache line.

14. A computer system comprising
   a display device;
   a memory for storing instructions;
   a processor for processing the instructions, the processor comprising:
     a mid-level cache circuit (MLC) for storing a first set of cache lines containing instructions and/or data;
     a last level cache circuit (LLC) for storing a second set of cache lines of instructions and/or data, wherein the LLC includes a data structure for storing a trip count (TC) value and use count (UC) value, the TC and UC values being combinable to determine whether to insert or not insert a cache line into the LLC; and
     an insertion circuit for implementing a policy for inserting or replacing cache lines within the LLC based on TC and UC values associated with the lines.

15. The computer system claim 14 wherein an exclusive cache policy is implemented such that when a cache line is stored in the LLC it is not stored in the MLC and when a cache line is stored in the MLC it is not stored in the LLC.

16. The computer system as in claim 14 wherein when a cache line is filled into the MLC from memory or from the LLC by a demand request, its UC value is set to one.

17. The computer system as in claim 16 wherein when a cache line is filled into the MLC by a prefetch request, its UC is set to zero.

18. The computer system as in claim 14 wherein a plurality of observers are defined which allocate all cache lines in the LLC and implement a static insertion age assignment based on a single-bit trip count (TC) value of an incoming cache line.

* * * * *